J. MUSKETT.
RUBBER COVERED ROLLER.
APPLICATION FILED OCT. 18, 1916.
1,226,984.
Patented May 22, 1917.
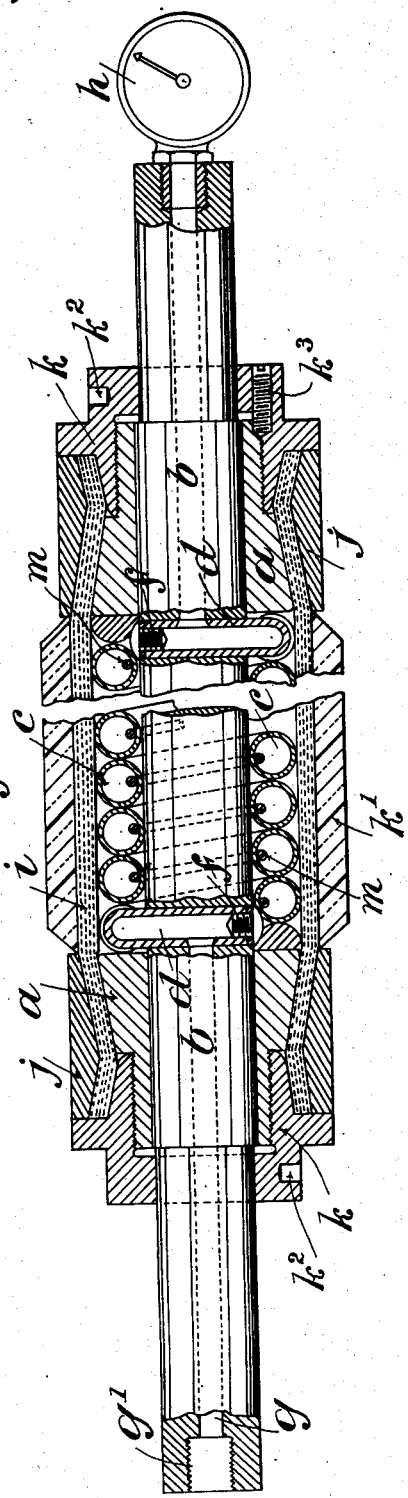
Fig. 1.
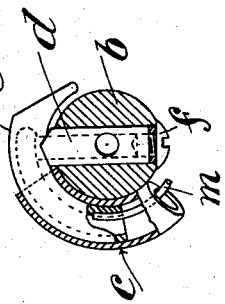
Fig. 3.
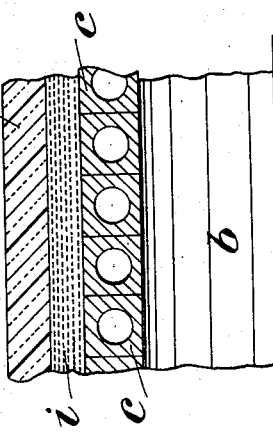
Fig. 2.
Inventor
Jabez Muskett
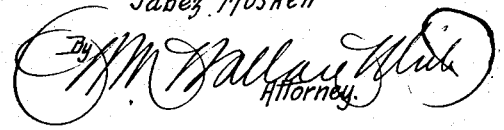
Attorney.

UNITED STATES PATENT OFFICE.

JABEZ MUSKETT, OF PENDLETON, MANCHESTER, ENGLAND.

RUBBER-COVERED ROLLER.

1,226,984.

Specification of Letters Patent.   Patented May 22, 1917.

Application filed October 18, 1916.   Serial No. 126,396.

*To all whom it may concern:*

Be it known that I, JABEZ MUSKETT, a subject of the King of Great Britain and Ireland, residing at 42 Delamere avenue, Swinton Park Road, Pendleton, Manchester, in the county of Lancaster, England, have invented new and useful Improvements in Rubber-Covered Rollers, of which the following is a specification.

The invention relates to rubber covered rollers of the cushion type used in various machines for different purposes and has reference to the type of roller in which a metal mandrel or core is provided with a spiral winding of rubber tubing under fluid pressure. This periphery of rubber tubing is wrapped with fabric, and an outer sleeve, of rubber is vulcanized upon such wrapping. My invention relates particularly to means for securing the wrapping of fabric and also to means for preventing the spiral tubing from creeping endwise.

In the accompanying drawings,

Figure 1 shows a roller, broken in length, constructed in accordance with my invention, in sectional side elevation.

Fig. 2 indicates a modification and

Fig. 3 is a detail part.

In constructing the roller I provide a collar $a$ near each end of the metal mandrel or core $b$ the ends of the core projecting beyond the collars $a$ to form the bearings for the roller. The collars may be turned out of the metal of the core, or may be separate therefrom as shown and secured to the core in any convenient manner. Each collar $a$ on the inside is formed tapering or inclined upward and inward and outside this taper the collar is reduced in diameter, and screw threaded. The rubber tubing $c$ is wound spirally around the mandrel between the collars and means are provided, to inflate it with air. Such means consist in providing the shaft $b$ at, and near each end, with a cross tube $d$ forced tightly into a hole bored in the shaft, and brazed or otherwise secured to a crescent shaped piece $e$ which is bored out at one end only with a passage to communicate with a hole in the tube $d$ as shown in Fig. 3. The cross tube is blocked up at one end by means of the stud $f$. A hole $g$ is bored through the end of the shaft $b$ and into the cross tube $d$ and one end of the shaft is provided at $g'$ with any suitable type of non-return valve the other end having a pressure gage $h$. The ends of the spiral tubing $c$ are forced on the crescent pieces $e$ as shown in Fig. 3. The fabric $i$ is wrapped around the rubber tubing and the inclined or tapered periphery of the end collars $a$ and means are provided to jam it securely upon the collars. To effect this a shell of metal $j$ formed on the inside with an internal taper corresponding to the taper on the collars $a$ is threaded on the end of the wrapping of fabric. This shell at the outside is also formed with an internal taper directed outward and upward. A clamping ring $k$ is screwed on the reduced screwed extension of the collar $a$ such ring having a taper part corresponding to the outer taper of the shell. When this clamping ring is screwed home the end of the wrapping of fabric is inclosed between the shell, the ring and the collar as shown in the drawing and the fabric is securely bound or clamped upon the end collar. The clamping ring would be provided with recesses or the like $k^2$ to enable it to be screwed on the collar by a tool and the ring may be secured to the collar by a grub screw $k^3$ or the like. The outer rubber sleeve $k'$ which is vulcanized upon the wrapping of fabric may terminate at the inner ends of the collars $a$ as shown, or it may be made long enough to cover and be flush with the clamping ring. Air is pumped through the non-return valve into the tubing until the desired pressure therein is attained, as indicated by the gage. Although air is preferable the tubing may be filled with water or other fluid. To prevent the coils of tubing $c$ from creeping longitudinally, I inclose a stout copper or like wire $m$ in the tubing to bind the spiral tubing securely upon the metal core or mandrel. The ends of the copper wire are securely anchored, which may be effected by brazing the ends within the crescent shaped fittings $e$ upon which the rubber tubing is forced as shown in Fig. 3. I may if desired use tubing $c$ square in cross section as indicated in Fig. 2.

I declare that what I claim is:—

1. A rubber covered roller having a metal core with end collars and journals and rubber tubing wrapped spirally around the metal core between the end collars, covered with a wrapping of canvas and an outer rubber envelop, means for inflating the rubber tubing, and means for securing the wrapping of canvas to each end collar consisting of the end collar $a$ formed with a taper surface and reduced screwed extension, a shell $j$ with corresponding internal taper and an internal oppositely arranged taper, a ring $k$ to screw upon the collar $a$ and formed with a taper surface the canvas being clamped between the two oppositely arranged tapered surfaces provided by the end collar, shell, and ring substantially as described.

2. In a rubber covered roller having rubber tubing wrapped spirally around a metal core the means for preventing the coils of tubing from creeping longitudinally consisting of an inserted copper or like wire $m$ which binds the tubing securely upon the metal core substantially as described.

In testimony whereof I have signed my name to this specification in the presence of two subscribing witnesses.

JABEZ MUSKETT.

Witnesses:
 JOSHUA ENTWISLE,
 ALFRED STUART YATES.